United States Patent
Kudryashov et al.

(10) Patent No.: US 9,727,292 B1
(45) Date of Patent: Aug. 8, 2017

(54) DESKTOP WITH ACTIVE CORNERS

(75) Inventors: Sergey R. Kudryashov, Moscow (RU); Andrey A. Omelyanchuk, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 1696 days.

(21) Appl. No.: 12/958,580

(22) Filed: Dec. 2, 2010

(51) Int. Cl.
*G06F 3/14* (2006.01)
(52) U.S. Cl.
CPC .................................... *G06F 3/14* (2013.01)
(58) Field of Classification Search
CPC ..................................... G06F 3/14; G06F 3/17
USPC ......... 715/200–277, 700–867; 700/701–866; 709/201–229; 705/50–79; 345/30–111, 345/179, 420
See application file for complete search history.

(56) References Cited

U.S. PATENT DOCUMENTS

| 6,078,323 | A * | 6/2000 | Gest | 715/711 |
| 7,212,203 | B2 * | 5/2007 | Payne | 345/420 |
| 2007/0136417 | A1 * | 6/2007 | Kreiner et al. | 709/203 |
| 2009/0254843 | A1 * | 10/2009 | Van Wie et al. | 715/757 |
| 2011/0007035 | A1 * | 1/2011 | Shai | 345/179 |

FOREIGN PATENT DOCUMENTS

JP 2011221828 A * 11/2011 ............ G06F 3/048

* cited by examiner

*Primary Examiner* — Ruay Ho
(74) *Attorney, Agent, or Firm* — Bardmesser Law Group (57) ABSTRACT

In a virtualized system, a number of Virtual Machines (VMs) have their own GUIs. A full screen desktop has active corners that roll up in response to user action, such as mouse move or touch screen action. An active corner of the desktop rolls up allowing a user to select another VM application or another display mode without taking any special actions for getting out of a full screen mode. The switch feature does not take up any space on the desktop.

36 Claims, 6 Drawing Sheets

DESKTOP WITH ACTIVE CORNERS

BACKGROUND OF THE INVENTION

Field of the Invention

This invention relates to a method, system and computer program product for switching between GUIs of various virtual environments running on a computer system.

Description of the Related Art

One of the features that many computer users desire to have today is interoperability between applications written for different operating systems. For example, the Apple Macintosh computer and its GUI, browser and operating system have a loyal following in the marketplace. At the same time, Apple Computer, Inc.'s market share is approximately 7-8% of the overall desktop and laptop computer market.

As a result, the number of software titles that are written for the Microsoft Windows platform (which is approximately 85-90% of the market) is vastly greater than the number of software titles written for the Apple Macintosh. Nonetheless, many Apple Macintosh users would like to be able to run Windows applications on their Macintosh's, and to do it as seamlessly as possible. This feature is provided by virtualization means, where a Virtual Machine (VM) running its own Operating System is implemented under a native operating system of a computer.

However, switching between the GUIs of each of the VMs is difficult, especially when user employs a full screen mode on his desktop. Typically, it requires pressing a special combination of keys on a keyboard that a user has to memorize.

Touch screen applications, e.g., "Alreader", with sensitive zones corresponding to hardware display regions (middle, up, bottom, left, right and borders) are known. There, actions, including pages "roll up", are usually performed without a prompt. Actions corresponding to active borders may be displayed on the screen.

Other examples of known systems include Active Screen Corners in Mac OS X Leopard that change screen mode without a prompt if a user moves the cursor through an active zone. Also, applications with dropped down menus are known, as are locations from where menu is dropped, which is usually indicated on the screen. After the menu is dropped down, the user has several choices or he will see a prompt. See also http:**en.wikipedia.org/wiki/Drop-down-_list: "A drop-down list is a user interface control GUI element, similar to a list box, which allows the user to choose one value from a list. When a drop-down list is inactive, it displays a single value. When activated, it displays (drops down) a list of values, from which the user may select one." The Floating Dock in MacOS has floating task panel also provides a user with menu.

Accordingly, an easy and convenient way of switching between GUIs of seamlessly integrated non-native OS applications is desired.

SUMMARY OF THE INVENTION

Accordingly, the present invention is related to a system, method and computer program product for switching between GUIs of non-native applications seamlessly integrated into the host OS that substantially obviates one or more of the disadvantages of the related art.

In a virtualized system, a number of Virtual Machines (VMs) run under a host OS. Each VM (or VM applications) have their own GUIs. A full screen desktop has active corners that roll upon user action, such as mouse move or touch screen. An active corner of the desktop rolls up allowing a user to select another VM (or application or another display mode) without taking any special actions for getting out of a full screen mode. The switch feature is implemented as active corners and, advantageously, does not take up any space on the desktop.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The following definitions are generally used throughout this description:

VEE—a type of environment that supports program code execution, where at least a part of the real hardware and software required for running program code are presented as their virtual analogs. From the point of view or a user, the code in VEE runs as if it were running on the real computing system.

VM—a type of an isolated Virtual Execution Environments running on the same physical machine simultaneously. Each Virtual Machine instance executes its own OS kernel. Support of Virtual Machines is implemented using a Virtual Machine Monitor and/or a Hypervisor.

Virtual disk driver—an OS driver that enables other programs to interact with a virtual hardware device. The virtual disk driver may be implemented as a special driver or may be implemented by adding, to the standard hardware driver, additional functionality, for example, filtering or redirecting ability. The disk image and virtual disk driver can be used by the VMs of the present invention as one possible implementation.

An exemplary embodiment involves launching of a Virtual Execution Environments (such as VMs), within which different applications are running. For purposes of illustration, the computer at issue is an Apple Macintosh computer, running Apple's OS with the usual Apple desktop. A user would like to launch a Windows applications using Windows 7 desktop.

To do so, a Virtual Machine is launched, such that a Windows 7 desktop appears on the desktop screen (see FIGS. 2-5). The Windows 7 desktop shows the usual Windows icon, the Start button, the toolbar, menu bar, system tray, etc. That Windows desktop is implemented on a guest operating system, while Apple's OS/X is the host operating system (in this example).

A user uses a full screen mode on his desktop and Windows GUI occupies an entire screen. In a "full size" mode of the application, the VM can select from a set of possible resolutions for the non-native application version (in some cases same or different resolution as the desktop one to improve video card performance). As yet another option, network protocols, such as X-Windows support on UNIX, KDE, Gnome, Citrix Presentation Server with application streaming, etc. can be used.

The exemplary embodiment allows a user to switch between GUIs of different guest desktops of the VMs (or applications running on the VMs) or between different display modes by providing active corners on the desktop. Once the user clicks on the active corner, the corner "rolls up" and allows a user to click on other options not visible on the desktop. These options can switch between the desktops (i.e., guest and host desktops), applications, emulated applications, VMs, etc. Alternatively, active corners can provide various display menus. The active corners can be limited to just one corner or active pixels on the desktop, or to just a handful of pixels in the corner (or, in the extreme case, just one pixel in a corner or some other location).

This is particularly advantageous for those users who do not wish to concern themselves with the exact mechanics of how the Virtual Machine, and the applications launched within that Virtual Machine, interact with the host OS. A user simply knows that he can use active corners for switching between the desktops and the applications.

It should also be noted that although the discussion so far has been primarily in terms of integrated Windows OS applications into the Macintosh platform, the invention is not limited to this example. For example, Windows application can be integrated in this manner into a LINUX environment, and to switch from a full screen in LINUX a user can click on active desktop corners. As yet a further option, it is possible to handle full-screen guest applications by, for example, switching the host to full-screen mode with an ability to invoke other applications via active corners, without exiting the full-screen mode.

Note that user action can be a mouse click on the pre-defined corner area of the desktop, a mouse move and any of a touch screen user actions. Therefore, in case of full seamless integration, the Virtual Machine Monitor intercepts such an action by the user, and then handles it, for example, by recognizing an active corner event and informing the host (or guest) OS of that event, and invoking an active corner graphical process. Thus, when a cursor in the VM is brought to a specific area, a transparent window with a complex (non-rectangular) shape is drawn (for example, in the corner), and then, in that window, a "folded corner" is drawn in that window, such that a mirror image of a portion of the contents of the original window is drawn. Clicking in the remaining area of the transparent window will switch the desktop to the host. The windows underneath the current (VM) window are screenshotted, and are used as the background image for the effect of the folder corner. The size of the active corner can also be made variable or user-settable.

Once the active corner option is selected, the VM is informed, so that another VM can be launched, or the currently running VM can update its own objects or invoke another application or an emulated version of an application. Alternatively, a similar process can be invoked by an active screen area located in the upper or lower line of the screen. Alternatively, the active screen area can roll up a square-shaped area of the screen instead of just a corner.

It should be noted that the approach described herein is applicable not only to different host/guest OS's, but also to the situation where the guest OS is the same as the host OS (e.g., an MS Windows host desktop and an MS Windows VM). Also, active corners can be used with the native and non-native desktops as well, or a VM can be launched within another VM ("nested VMs"). Also, the same OS in guest and host can use direct access of VM support means to video and implement external integration of VM. In either case the proposed active corners feature allows for switching between the VM contexts or between the applications.

Note that the GUI can be implemented not only on network servers, but also on single workstations. The hardware system (e.g., single node, cluster of nodes, or single node with cluster of CPUs) has display means and performs operation with GUI support.

Furthermore, it is possible to have some aspects of the graphical user interface as the responsibility of one virtual environment, while other aspects are the responsibility of another. For example, the window appearance of UNIX type applications and Windows type applications is not exactly the same—the scroll bars, command bars, etc. of the window are somewhat different.

It is also possible to have the application itself (e.g., a Windows application) be responsible for the contents of that is displayed in that application's window, while a different application, for example, MAC OS, is responsible for the appearance of the scroll bars, and other features of the window itself—this provides a more consistent user interface, if the user so desires. This feature can also be turned on and off using active corners.

The active corner functionality can be used while calling a Windows application from an external VEE. If the user asks for "native" interface while calling the "non native" applications, the VEE that has the primary responsibility for that aspect of the graphical user interface will substitute Windows interface instead of the graphical representation of Unix interface.

Figure 1:
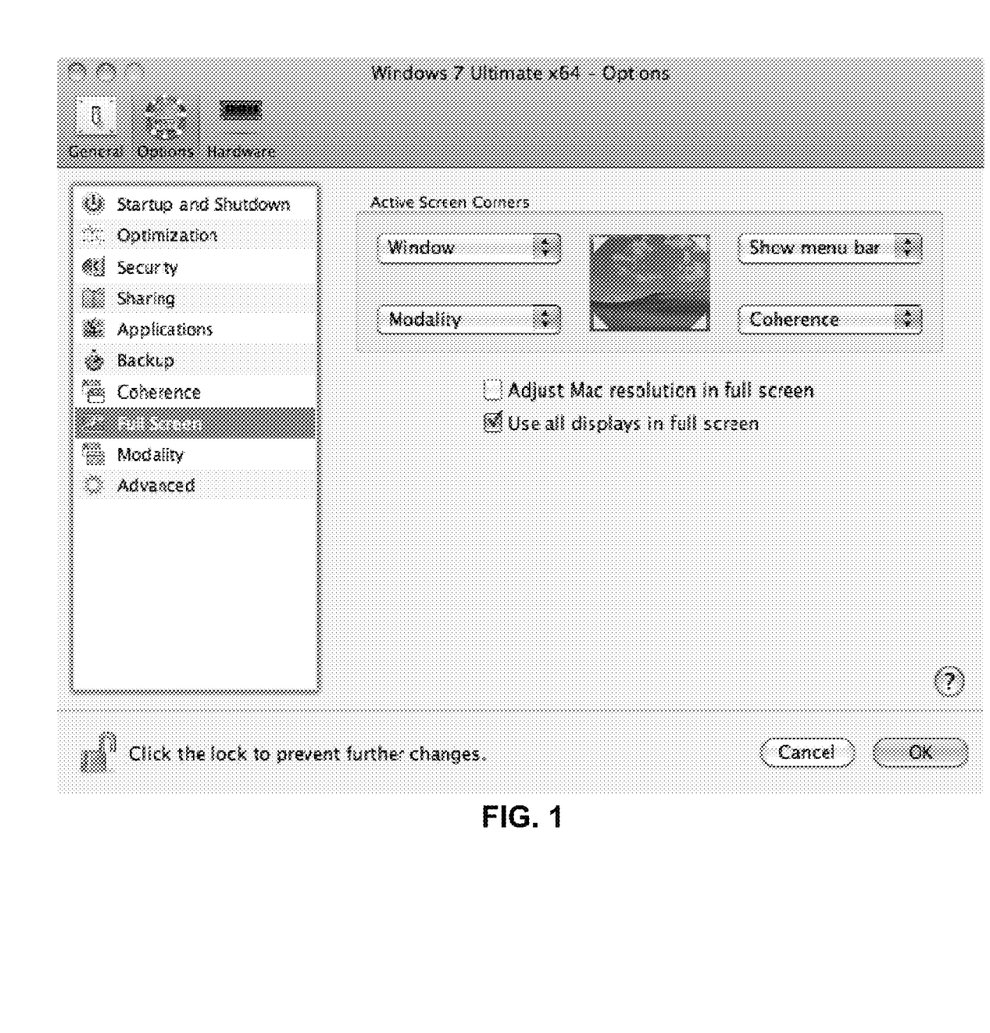
FIG. 1 illustrates a screen shot for user preferences for an active corner feature, in accordance with an exemplary embodiment.

FIG. 1 illustrates a screen shot for user preferences for an active corner feature, in accordance with an exemplary embodiment. A menu allows a user to assign different options (i.e., Windows—the user can work with Windows as a guest OS on top of the Mac desktop; Modality—the user can set the size and transparency of Windows, as well as scale Windows down, so he can view the complete Windows environment, rather than just a section of it; Coherence Windows programs and the Start Menu appear on the Mac Dock. With the Start Menu integrated into the Mac Dock, the user can seamlessly access his Windows apps and system utilities from the Mac's desktop, also Windows Taskbar Notification Icons can appear on the Mac Menu Bar; and menu bar) to the active corners of the desktop. Then, when the user action is performed on a particular active corner, the user is presented with a certain option or a set of options. The menu is presented to the user before usage of active corner. The user is asked for an action relating to the corresponding corner. In other words, different corners can be selected for different actions and menu choices.

Figure 2:
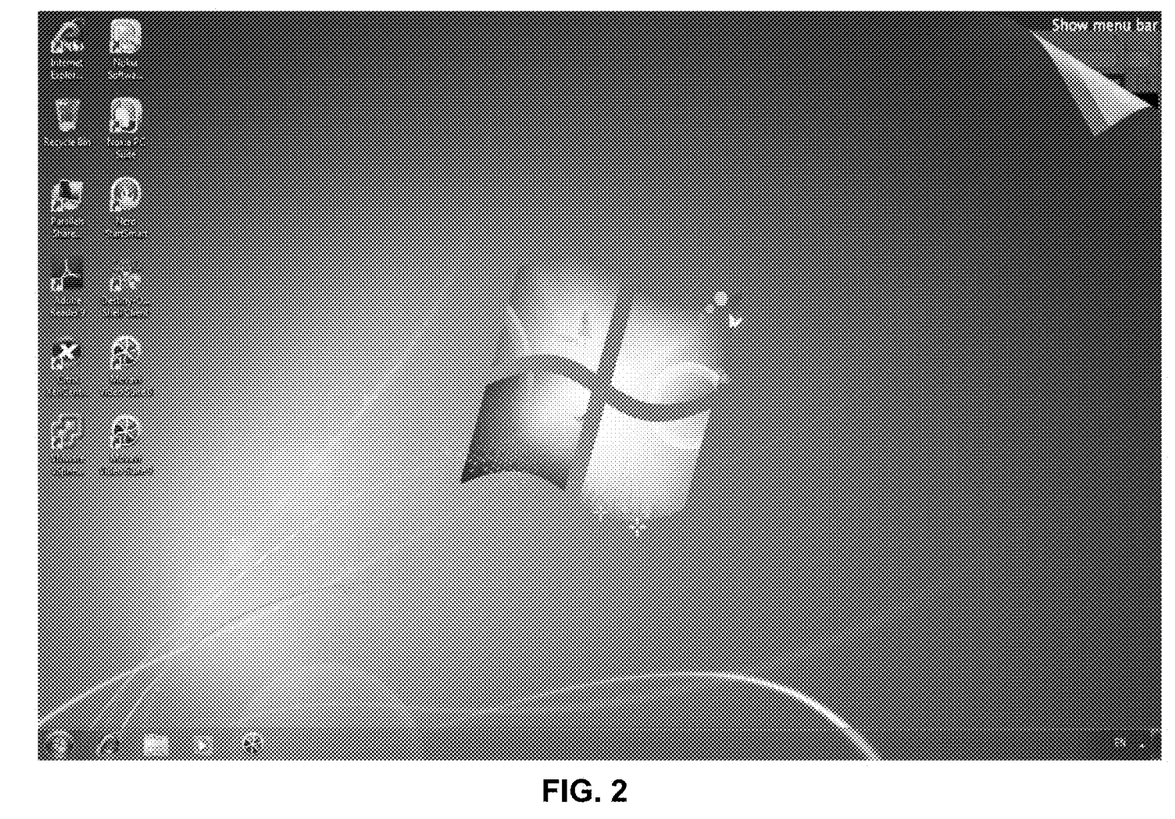
FIG. 2 illustrates a screen shot for the active corner feature that shows a menu bar, in accordance with an exemplary embodiment.
Figure 3:
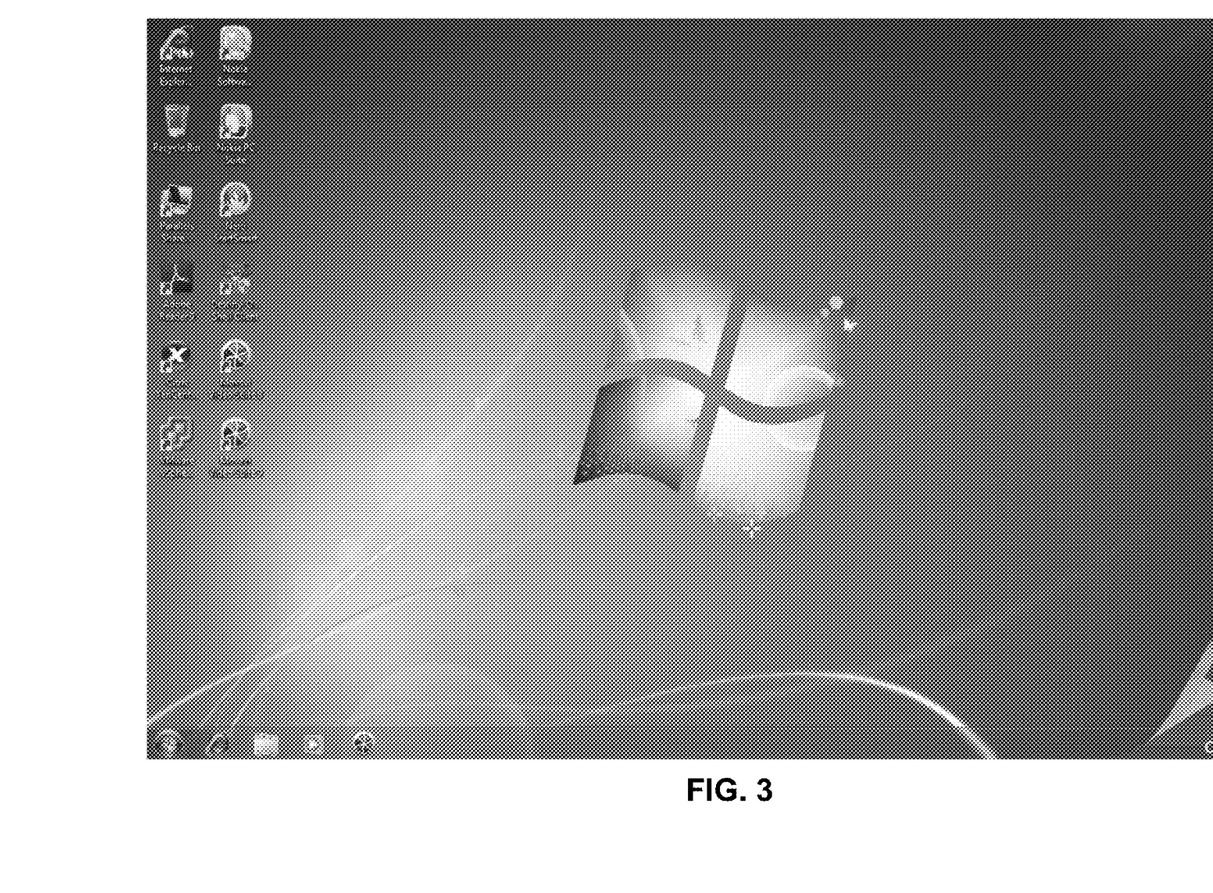
FIG. 3 illustrates a screen shot for the active corner that shows a Coherence feature, in accordance with an exemplary embodiment.
Figure 4:
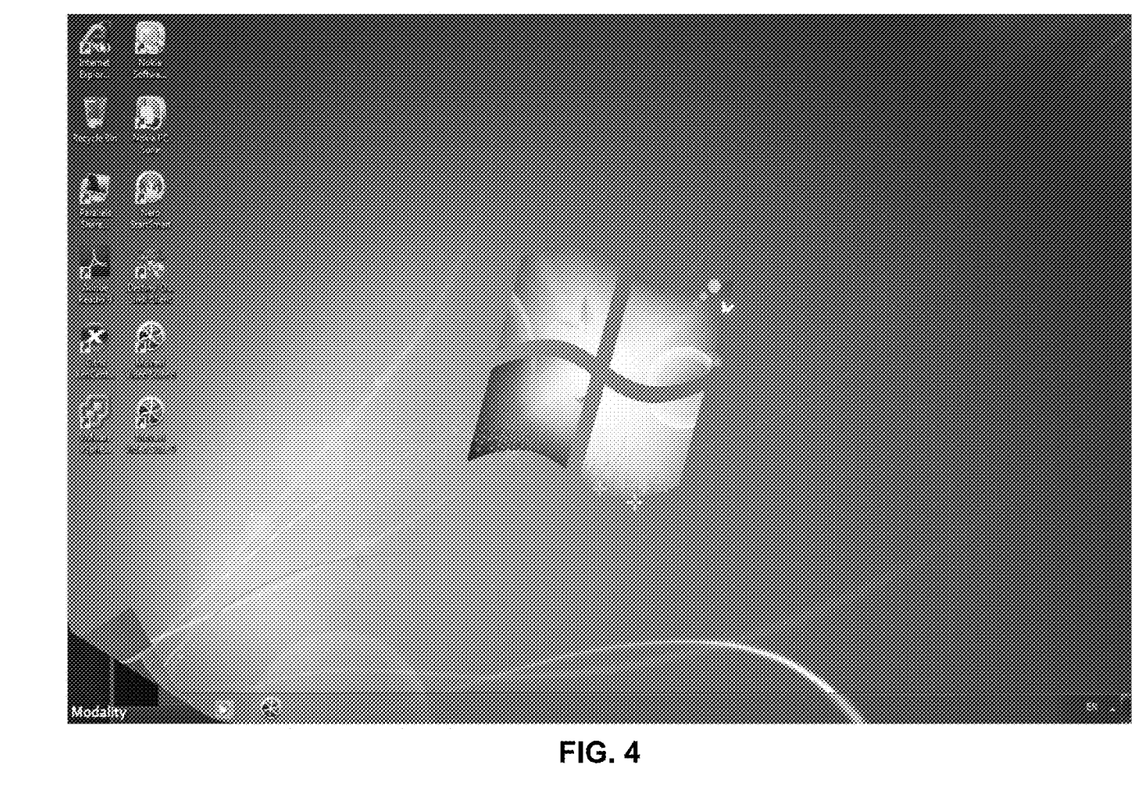
FIG. 4 illustrates a screen shot for the active corner that shows a Modality feature, in accordance with an exemplary embodiment.

For example, FIG. 2 illustrates a screen shot for the active corner feature that shows a menu bar in the top right hand corner. A user can "rollup" the corner and invoke a menu bar. FIG. 3 illustrates a screen shot of the bottom right active corner that shows a Coherence feature, in accordance with an exemplary embodiment. A user can "rollup" the corner and invoke the Coherence feature. FIG. 4 illustrates a screen shot of the active bottom left corner that shows a Modality feature, in accordance with an exemplary embodiment. A user can "rollup" the corner and invoke the Modality feature.

Figure 5:
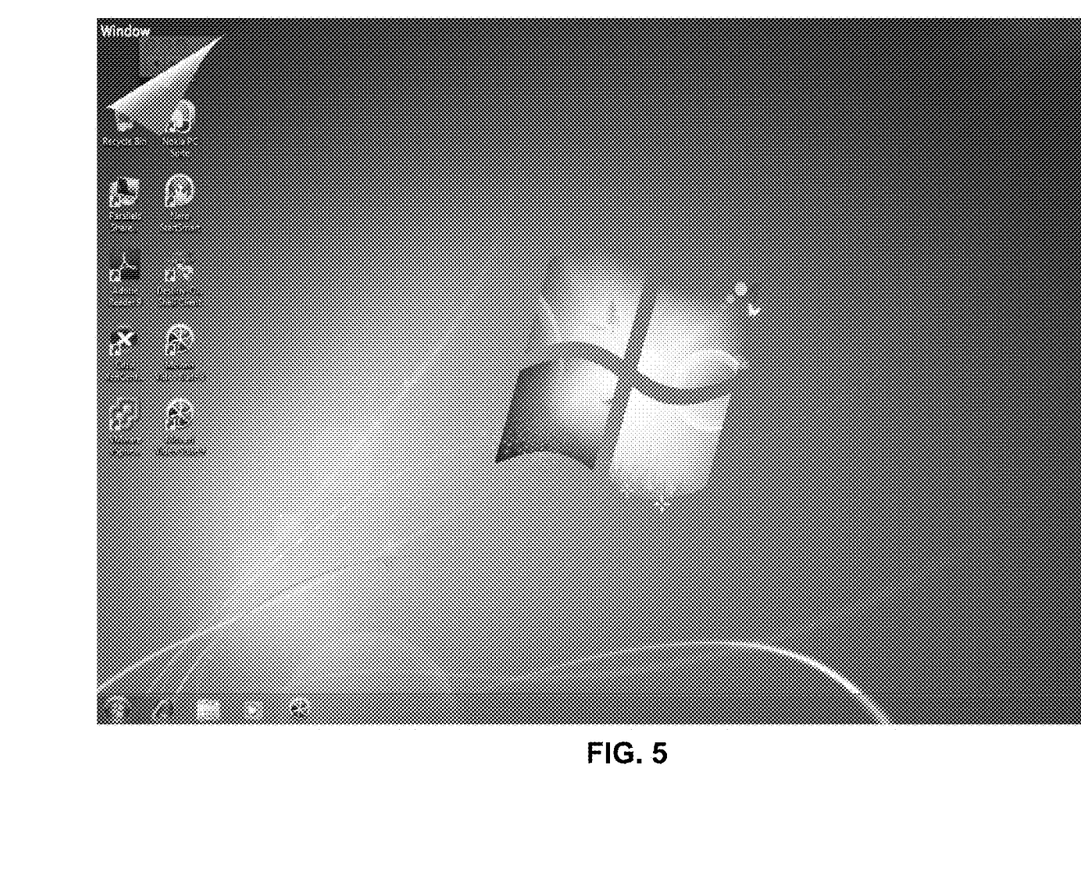
FIG. 5 illustrates a screen shot for the active corner that shows a window feature, in accordance with an exemplary embodiment.
Figure 6:
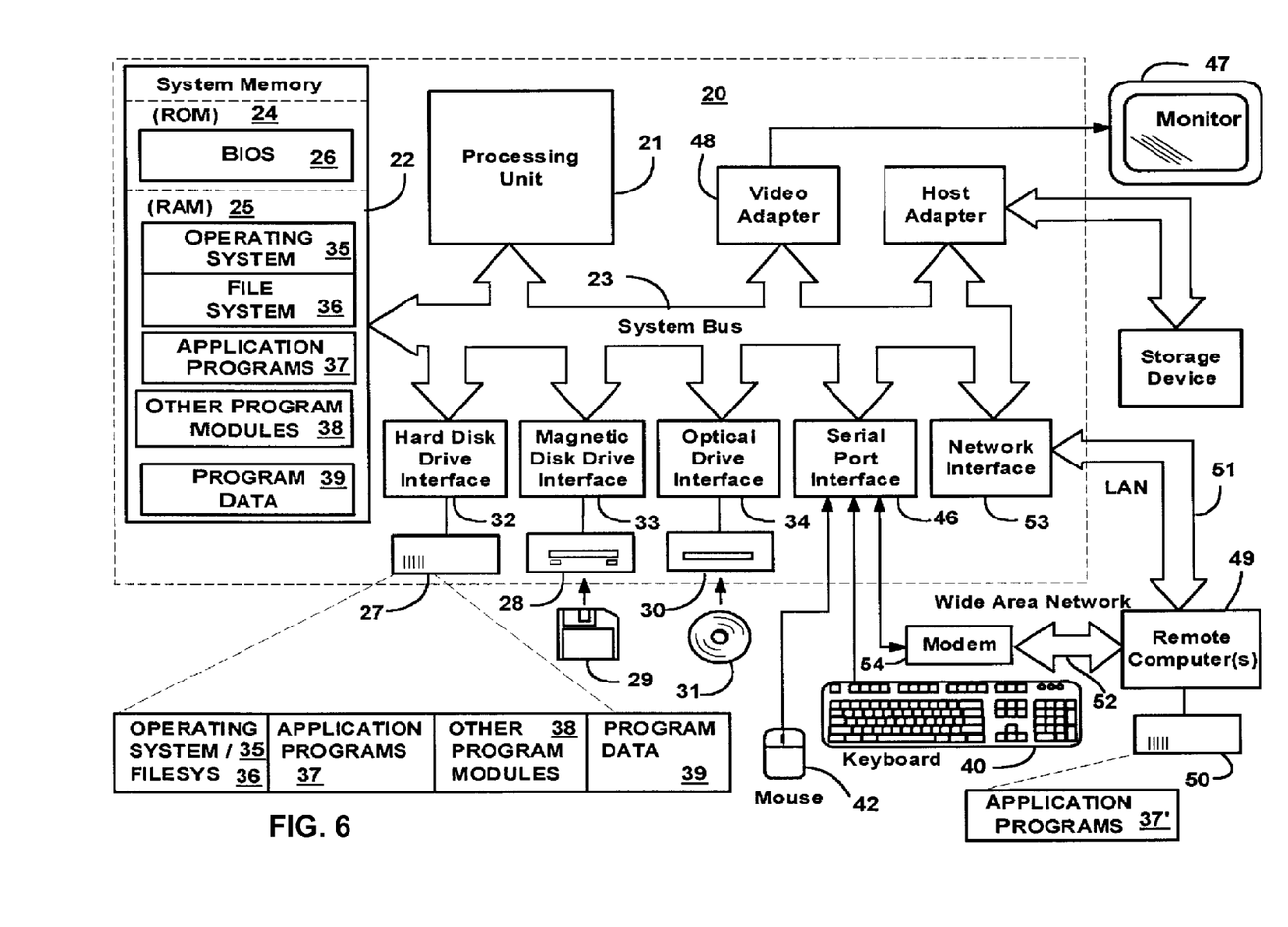
FIG. 6 illustrates an exemplary computer system on which the invention may be implemented.

FIG. 5 illustrates a screen shot for the top left active corner that shows a window feature, in accordance with an exemplary embodiment. A user can "rollup" the corner and invoke the window feature. With reference to FIG. 6, an exemplary system for implementing the invention includes a general purpose computing (or processing) device 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory optionally includes read-only memory (ROM) 24 and random access memory (RAM) 25. A basic input/output system 26 (BIOS), containing the basic routines that help transfer information between elements within the device 20, such as during start-up, is stored in ROM 24.

The computing device 20 can optionally include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein does not employ a hard disk, a removable magnetic disk 29 and a removable optical disk 31, it should be appreciated by those skilled in the art that these devices can also be used in the exemplary operating environment.

A number of program modules may be stored on the hard disk, magnetic disk 29, optical disk 31, ROM 24 or RAM 25, including an operating system 35. The computing device 20 includes a file system 36 associated with or included within the operating system 35, one or more application programs 37, other program modules 38 and program data 39. A user may enter commands and information into the computing device 20 through input devices such as a keyboard 40 and pointing device 42, but these devices are optional. The exemplary embodiment provides a virtual keyboard and a "touch screen" option for pointing.

These and other input devices are often connected to the processing unit 21 through a serial port interface 46 that is coupled to the system bus, but may be connected by other interfaces, such as a parallel port, game port or universal serial bus (USB). A monitor 47 or other type of display device can be optionally connected to the system bus 23 via an interface, such as a video adapter 48. In the exemplary embodiment, an integrated display is used.

The computing device 20 may operate in a networked environment using logical connections to one or more remote computers 49. The remote computer (or computers) 49 may be another computer, a server, a router, a network PC, a peer device or other common network node, and typically includes many or all of the elements described above relative to the device 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the device 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for switching between Graphical User Interfaces (GUIs), the system comprising:
   a plurality of Virtual Machines (VMs) running on a computing system, each VM having its own GUI;
   a first VM, of the plurality of VMs, having a full-screen GUI desktop being displayed, such that no portion of a host desktop of the computing system or host applications of the computing system is visible;
   a hidden graphical area underlying the full-screen GUI desktop and responsive to a human interface device used for performing actions over the full-screen GUI;
   means for performing a switching GUI operation between the full-screen GUI desktop and the hidden graphical area; and
   an active area on the full-screen GUI desktop;
   wherein upon bringing a pointing element of the human interface device on the active area, the hidden graphical area is shown to the user, and
   wherein, in response to a user performing a first predefined action, the full-screen GUI desktop of the first VM is restored and the hidden graphical area is no longer visible;

wherein, in response to a user performing a second predefined action on the active area, the switching GUI operation is performed and the host desktop becomes visible, while a desktop of the first VM is now shown in a window that occupies a portion of the host desktop.

2. The system of claim 1, wherein the switching GUI operation comprises displaying portions of desktops of other VMs.

3. The system of claim 1, wherein the switching operation further comprises switching between Graphical User Interfaces related to different VMs.

4. The system of claim 1, wherein the human interface device is any of a mouse, a stylus, a touch screen, a keyboard or any combination thereof.

5. The system of claim 4, wherein the first predefined action is performed using a keyboard key.

6. The system of claim 4, wherein the second predefined action is performed using a keyboard key that moves the pointing element over the full-screen GUI desktop.

7. The system of claim 1, further comprising multiple hidden graphical areas underlying the full-screen GUI desktop, each hidden graphical area having a corresponding active area.

8. The system of claim 1, wherein the active area is defined as a desktop edge and/or as a corner point of the full-screen GUI desktop.

9. The system of claim 1, wherein the hidden graphical area represents a GUI of another VM.

10. The system of claim 1, wherein the full-screen GUI desktop utilizes multiple video displays.

11. The system of claim 1, wherein full-screen guest applications of the VMs are handled by switching the host to a full-screen mode and invoking the guest applications via without exiting the full-screen mode of the host.

12. The system of claim 1, further comprising a Virtual Machine Monitor supervising the VMs and having system-level privileges, wherein the Virtual Machine Monitor intercepts the first and second predefined actions.

13. The system of claim 1, wherein at least one of the VMs is a nested VM.

14. The system of claim 1, wherein both host OS and guest OS in at least one of the VMs use direct access of VM support means to video hardware through hardware virtualization support.

15. A system for switching between Graphical User Interfaces (GUIs), the system comprising:
  a plurality of isolated Virtual Execution Environments (VEEs) running on a single computing system, each VEE having its own GUI;
  a first VEE of the plurality of VEEs, having a full-screen GUI desktop being displayed;
  a hidden graphical area underlying the full-screen GUI desktop and responsive to a human interface device used for performing actions over the full-screen GUI;
  means for performing a switching GUI operation between the full-screen GUI desktop and the hidden graphical area; and
  an active area on the full-screen GUI desktop;
  wherein upon performing an action using a human interface device on the active area, the hidden graphical area is shown to the user, and
  wherein, in response to a user performing a first predefined action, the full-screen GUI desktop of the first VEE is restored;
  wherein, in response to a user performing a second predefined action on the active area, the switching GUI operation is performed, and
  wherein the showing of the hidden graphical area includes rolling up a part of the full-screen GUI desktop over the hidden graphical area, with an icon in the hidden graphical area for invoking an application of another VEE or a host via, without exiting the full-screen GUI.

16. The system of claim 15, wherein the hidden graphical area presents at least a part of full-screen GUI corresponding to another VEE.

17. The system of claim 15, wherein each VEE is a Virtual Machine having its own guest operating system and its own guest applications.

18. A system for switching between Graphical User Interfaces (GUIs), the system comprising:
  a plurality of Virtual Execution Environments (VEEs) running on a computing system, each VEE having its own GUI;
  a first VEE of the plurality of VEEs, having a full-screen GUI desktop being displayed;
  a hidden graphical area underlying the full-screen GUI desktop and responsive to a human interface device used for performing actions over the full-screen GUI;
  means for performing a switching GUI operation between the full-screen GUI desktop and the hidden graphical area; and
  an active area on the full-screen GUI desktop;
  wherein upon performing an action using a human interface device on the active area, the hidden graphical area is shown to the user, and
  wherein, in response to a user performing a first predefined action, the full-screen GUI desktop of the first VEE is restored;
  wherein, in response to a user performing a second predefined action on the active area, the switching GUI operation is performed, including a context switch between the first VEE and a host operating system, and
  wherein the hidden graphical area is exposed by rolling up a corner of the full-screen GUI desktop adjacent to the active area.

19. The system of claim 18, wherein a mirror image of a portion of the contents of the full-screen GUI desktop of the first VEE is displayed in the corner.

20. The system of claim 19, wherein windows underneath a current window are screenshotted, and are used as the background image for the corner.

21. A system for switching visual modes, the system comprising:
  a computing system having a Virtual Machine (VM) running on it;
  a guest operating system (OS) of the VM supporting a guest desktop occupying an entire visible part of a video display of the computing system, such that no portion of a host OS desktop of the computing system or host applications of the computing system is visible;
  a human interface device adapted to interface to the guest desktop and the host OS desktop;
  an application running in full screen mode in the guest OS, with the application screen occupying the entire guest desktop;
  a hidden area of a host OS desktop underlying the application screen;
  a sensitive area associated with a video display;
  wherein, upon a user indicating the sensitive area with the human interface device, the hidden area is displayed on the guest desktop and a dynamic menu area is activated as part of the now-visible hidden area, and
  wherein, upon the user performing a predefined action using the human interface device on the activated dynamic menu area, a corresponding action is performed by a computing system.

22. The system of claim 21, wherein the corresponding action is reflected on the video display.

23. The system of claim 22, wherein the reflected action is switching a viewing mode to display elements of either other VM desktops or of the host desktop.

24. The system of claim 21, wherein a user performs the predefined action on the dynamic menu area using a pointing element of the human interface device.

25. The system of claim 24, wherein the human interface device is mouse.

26. The system of claim 21, wherein the system includes multiple displays, each display having own full screen application.

27. The system of claim 21, wherein the system includes multiple video displays with the guest desktop occupying all visible parts of the multiple video displays.

28. The system of claim 21, wherein the sensitive area is adjacent to a border of the host OS desktop.

29. The system of claim 21, further comprising:
computer program code supporting the sensitive area executed outside the host OS;
computer program code for supporting the dynamic menu area executed outside the host and a driver for the human interface device supported outside the host OS.

30. The system of claim 21, wherein the dynamic menu area is displayed over the hidden area when the hidden area is visible.

31. The system of claim 21, wherein the visual mode is full screen mode and the action is switching to a windowed mode where the guest desktop is displayed in a window and elements of the host OS desktop are now visible.

32. The system of claim 21, wherein the hidden area represents a full screen GUI of another VM's guest desktop.

33. The system of claim 21, wherein the user is prompted to choose a location of the sensitive area and a style of opening the hidden area.

34. The system of claim 21, wherein, upon the user performing a second predefined action using the human interface device after the hidden area is displayed on the guest desktop, the hidden area is then made invisible again and the dynamic menu area is deactivated.

35. A system for switching visual modes, the system comprising:
a guest operating system (OS) of a Virtual Execution Environment (VEE) supporting a guest desktop occupying a visible part of a video display of the computing system;
a human interface device adapted to indicate an area of the guest desktop;
an application running in full screen mode in the guest OS, with the application screen occupying the guest desktop;
a hidden area of a host OS desktop underlying the application screen;
a sensitive area associated with a video display;
wherein, upon a user indicating the sensitive area with the human interface device, the hidden area is displayed on the guest desktop and a dynamic menu area is activated, and
wherein, upon the user performing a predefined action using the human interface device on the activated dynamic menu area, a corresponding action is performed by a computing system, and
wherein the active area is indicated by a rolling up of the guest desktop.

36. The system of claim 35, wherein the hidden area is a plurality of corners of a display such that different corners are configured for different dynamic menu choices.

* * * * *